United States Patent [19]
Bourgault et al.

[11] Patent Number: 5,251,704
[45] Date of Patent: Oct. 12, 1993

[54] DETACHABLE HARROW SPRAYER

[75] Inventors: Gerard F. Bourgault; Darryl Kerr, both of St. Brieux, Canada

[73] Assignee: F.P. Bourgault Industries Air Seeder Division Ltd., Saskatchewan, Canada

[21] Appl. No.: 830,322

[22] Filed: Jan. 31, 1992

[30] Foreign Application Priority Data

Sep. 12, 1991 [CA] Canada .................. 2051253

[51] Int. Cl.⁵ ............................................ A01B 49/06
[52] U.S. Cl. .................................. 172/311; 172/247; 172/249; 172/252; 172/253; 172/763; 172/753; 403/325; 239/168
[58] Field of Search ............... 172/311, 456, 272, 273, 172/247, 249, 250-253, 199, 200, 762, 763, 751, 753; 239/161, 162, 164-168; 403/325, 378, 379

[56] References Cited

U.S. PATENT DOCUMENTS

| | | | |
|---|---|---|---|
| 1,885,369 | 11/1932 | Bogart | 239/166 X |
| 3,091,296 | 5/1963 | Lohrman et al. | 172/456 |
| 3,107,055 | 10/1963 | Palmer | 239/167 X |
| 3,774,694 | 11/1973 | Gates | 172/763 X |
| 4,171,172 | 10/1979 | Johnston | 172/763 X |
| 4,299,292 | 11/1981 | Hughes | 172/311 |
| 4,739,930 | 4/1988 | Pask | 239/167 X |
| 4,813,489 | 3/1989 | Just et al. | 172/311 X |

FOREIGN PATENT DOCUMENTS 1258835 8/1989 Canada .
1535402 1/1990 U.S.S.R. .................. 172/456

OTHER PUBLICATIONS

System 82 Flexi-Coil Harrow Drawbar.

Primary Examiner—David H. Corbin
Assistant Examiner—Spencer Warnick
Attorney, Agent, or Firm—Wenderoth, Lind & Ponack

[57] ABSTRACT

There is disclosed a new and improved rearwardly folding combination harrow sprayer drawbar A plurality of quick detach harrow arms are adapted to be quickly connected and disconnected to a plurality of harrow arm receivers. The implement can be used for spraying and harrowing at the same time, or once the harrows are detached and left in the field, the implement can be used for post-emergent spraying A wet spray boom can be height adjusted by means of a plurality of manual spring loaded levers. The unit is equipped with hinged boom draws which can be pinned to be rigid such that it can be moved rearwardly in order to re-attach the harrows quickly and easily. The unit is also capable of lifting the harrows into a transport position and folding rearwardly into a narrow transport position in order to pass over roads or move through narrow entrance ways.

6 Claims, 5 Drawing Sheets

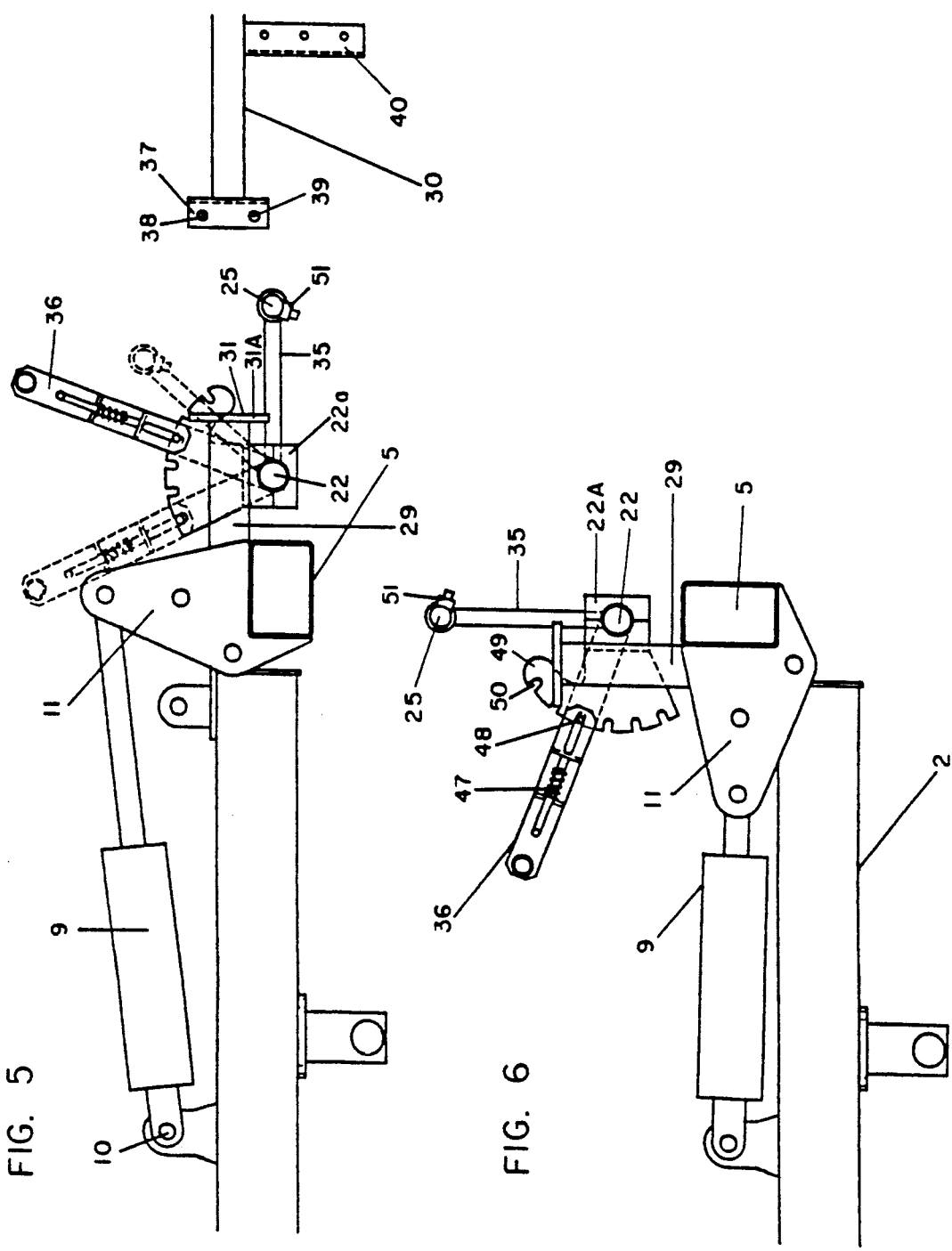

5,251,704

DETACHABLE HARROW SPRAYER

This invention relates to agricultural drawbars and more particularly, agricultural drawbars which are capable of both harrowing and spraying the field or performing one operation at a time.

BACKGROUND

Large width agricultural rearwardly folding implements are well-known in today's larger farming operations. Various combinations of implements mounted on one implement are now possible due to the high powered tractor commonly in use. One useful combination implement is a combination sprayer and harrow.

An example of such a harrow drawbar is a Flexi-Coil System 82 TM which employs both a sprayer and harrows However, all of the sprayer/harrowers presently in use suffer from a number of disadvantages. Firstly, the height of the wet spray boom is not adjustable principally due to the positioning of the harrow arms. In some models, the maximum adjustable distance is 1"-3". Therefore, obtaining the optimal spray height, particularly when doing post-emergent spraying, is not possible.

Secondly, in those cases where only a spraying operation is required, the process of detaching the harrows on the present known devices is long and cumbersome, making it impractical to the average farmer. In particular, it is necessary to remove the harrows by undoing bolts, etc. Moveover, the harrow arms are fixedly connected to the harrows, which are very heavy and difficult to move, thus making the process of detachment and re-attachment very difficult.

Finally, most sprayers have flexible wing booms, generally in the form of cables. Because of this particular arrangement, the wing booms often move forwardly out of the optimal position transverse to the line of travel when the implement is being towed downhill In addition, flexible wing booms do not facilitate backing up of the implement. It is extremely difficult to place the machine back into a field position for re-attachment of the harrows.

Another problem with the present devices is the complicated and expensive hydraulic systems used for moving the wing boom support wheels and rotating the spray booms.

It is therefore an object of the present invention to provide a simple and inexpensive harrow sprayer farm implement.

It is an object of the present invention to provide a quick detach and re-attach system for harrows.

Thirdly, it is an object of the present invention to produce a harrow sprayer wherein the wet spray boom is height adjustable in order that the optimum spray height can be obtained.

Finally, it is an object of the present invention to provide a sprayer harrow which is easily moved in reverse in order to return to the original position where the harrows are quickly re-attached.

SUMMARY OF THE INVENTION

Therefore, this invention seeks to provide a rearwardly folding harrow sprayer implement adapted to be towed by a power source such as a tractor for use in pre and post-emergent spraying operations comprising:

a framed cart supported by wheel means including a forwardly extending hitch means and adapted to support a spray tank;

a central main boom mounted on said cart and at least two main wing boom sections attached to said main boom by means of universal type joints;

a plurality of harrow arm receivers fixedly mounted to said main booms, extending rearwardly therefrom when said implement is in a field position, and vertically therefrom when said implement is in a transport position;

a plurality of harrow lift arms, each adapted to flexibly support a harrow frame with a plurality of tines thereon, each of said arms including a detachable connection means adapted to receive one of said harrow arm receivers;

a power means adapted to rotate said main boom from said field position to said transport position and vice versa;

a dry spray boom comprising a central section and at least two wing sections, each of said sections being rotatably mounted on said implement and being parallel to said main booms, each of said dry spray booms lying adjacent said respective main booms;

a wet spray boom comprising a central section and at least two wing sections, each of said sections of said wet spray boom being spaced apart and parallel to respective dry spray booms and attached thereto by a series of struts which are perpendicular to said wet and dry spray booms;

means adapted to rotate said dry spray boom sections thereby raising or lowering said respective wet boom sections;

a plurality of spray nozzles attached to said wet spray boom sections;

a boom draw means adapted to become rigid by means of a pin attached to each main wing boom section to releasably latch to a latch arm extending outboard from said sprayer tank wagon, and further comprising a support arm pivotally attached to said tank wagon frame and said boom draw means;

wheel means adapted to support said main wing booms in said field and said transport positions;

wherein, when in operation, said harrow arms are disconnected from said harrow arm receivers, said harrow arms, harrow frames, and tines are left in the field permitting said implement to be used as a sprayer; and when said means adapted to rotate said dry spray boom sections are activated, said spray booms are raised or lowered to a desired height from the ground to provide an effective spraying operation for crops which have emerged from the ground;

and wherein when said spraying operation is terminated, and said implement is moved rearwardly to an original position, and said wet spray booms are activated to clear said harrow arms; said harrow arms are reconnected to said harrow arm receivers; thus providing an implement capable of both harrowing and spraying operations.

In a preferred embodiment of the present invention, a drawbar having two wing booms and a center boom which are connected by means of universal type joints, is used. Fixedly mounted on the main booms, both central and wing, are a plurality of rearwardly extending harrow arm receivers which consist of a rectangular steel elongate straight arm with an end plate mounted perpendicularly thereto.

The harrows consist of tines attached to framing which is attached to a harrow arm by means of cables and/or chains. The harrow arm which is adapted to fit on the harrow arm receiver has a U-shaped vertically oriented hitch mechanism having at the top portion thereof a horizontally extending rod. On the bottom portion thereof are a pair of aligned apertures.

When the harrows are required to be used, the harrow arm is moved manually by the operator towards the harrow arm receiver and the U-shaped hitch portion and rod slipped over the end plate. Because the harrow arms are flexibly connected to the harrow frames, the arm can easily be moved into the re-attachment position, without the operator having to bear the weight of the harrow frame and tines. Thereafter, a pin is pushed through the lower apertures under the elongate arm portion of the harrow arm receiver, thereby securing the hitch at the top and the bottom, around the end plate of the harrow arm receiver. Generally, the connection is relatively straight such that when it is necessary to put the implement into a transport position by means of power cylinders which rotate the main wing booms, the harrows will, when attached, swing upwardly out of contact with the ground.

The spray system consists of a relatively simple assemblage. There are three rotatably mounted dry spray booms which lie adjacent to the central and two wing main booms respectively. These are substantially parallel to the main booms. Unlike most present day harrow sprayers, the dry spray booms are mounted rearwardly of the central and wing main booms and are affixed to the underside of the harrow arm receivers. Extending outwardly and substantially rearwardly in a perpendicular manner from the dry spray boom are a number of struts. These struts are fixed and have brackets or bearings at their remote ends which are fixedly secured to a wet spray boom. The liquid herbicide or pesticide flows through the wet spray booms.

The dry spray booms are completely separate from one another and are adjustable in height by means of a manual height adjustment lever which cooperates with an arcuate gauge. There are a number of indentations about the circumference of the gauge adapted to receive a spring-loaded projecting pin from the lever.

When the harrow frames, arms, and tines are disconnected from the machine, one can rotate the dry spray boom and thus vary the height of the wet spray boom with its plurality of nozzles thereon from a lowermost position to a substantially vertical position, above the dry spray boom. Depending upon the height of the crop, wind conditions, terrain, or type of spray nozzle used, a variance in height can increase the effectiveness of the spray. The three individual wet spray booms are connected by flexible couplings such that the liquid chemical, herbicide or pesticide can run through the complete system.

There are two non-castoring wheels for support purposes on each wing boom; one wheel being effectively in contact with the ground when the boom is in the transverse field position; and the other being in contact with the ground once the boom is rotated to place the harrows in a vertically disposed position. Hinged boom draws in a rigid pinned position which are pivoted from the wings and detachably coupled to a cart frame prevent the wings from moving forwardly when the implement is moving downhill or when the implement is moved in the reverse direction.

BRIEF DESCRIPTION OF THE DRAWINGS

A preferred embodiment of the invention is described in greater detail in conjunction with the following drawings wherein:

FIG. 5 is an expanded view of FIG. 4 showing the implement in the field position; and FIG. 6 is a similar view showing the implement in the transport position.

DETAILED DESCRIPTION OF THE INVENTION

Figure 1:
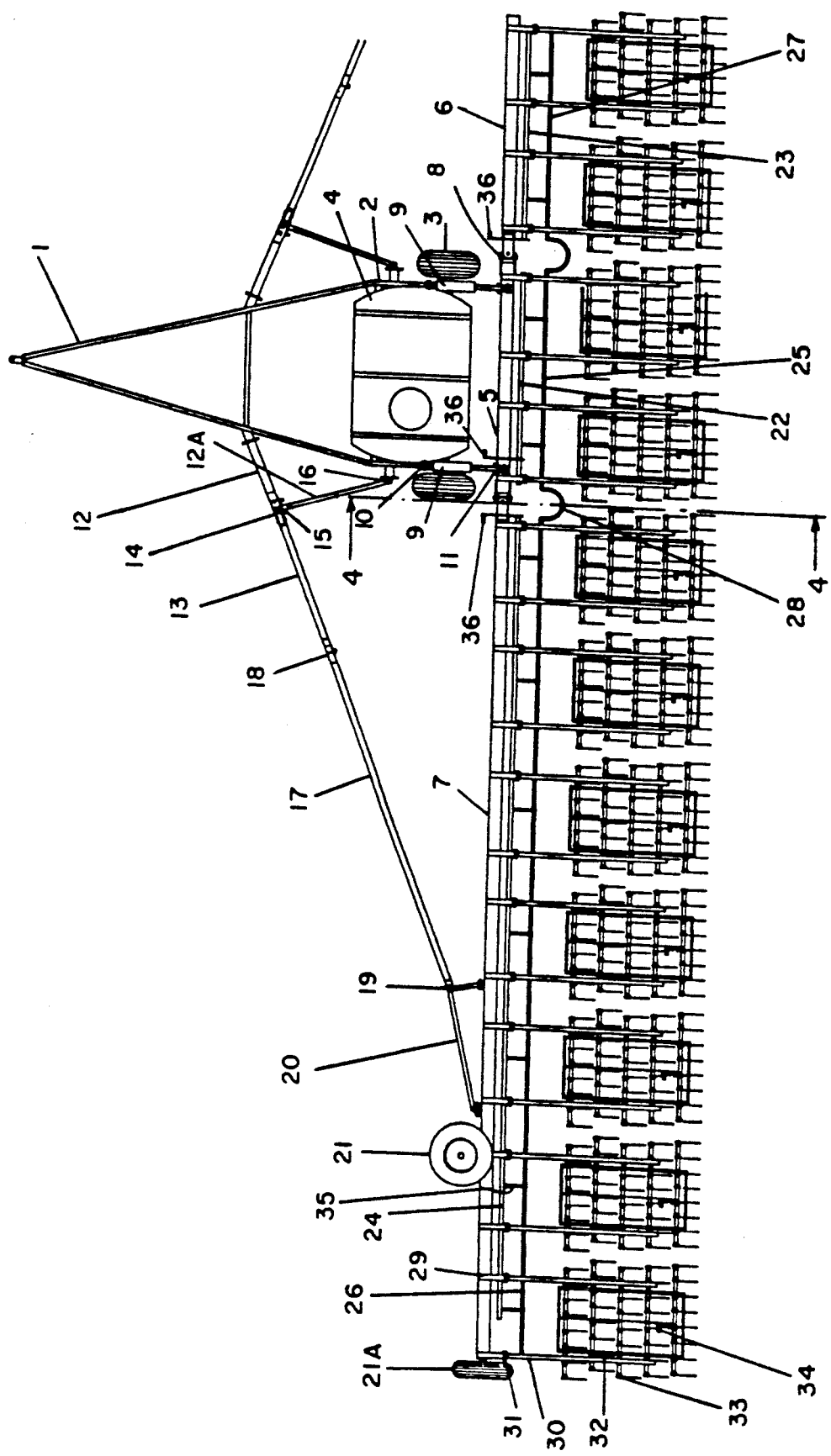
FIG. 1 is a top schematic of the harrow sprayer in field operating position with harrows attached.

In top view, shown in FIG. 1, the implement has a front hitch 1 attached to a cart frame 2, supported by wheels 3, and adapted to hold the tank 4. At the rear of the cart is attached a main center boom 5. On each side of the main center boom there is a right wing main boom 6 and a left main wing boom 7. The wing booms are connected to the main center boom by means of universal type joints 8.

In order to go from field position to transport position, the main center boom 5 is rotated, and similarly, because of the universal type joints 8, right wing main boom 6 and left main wing boom 7 also rotate. Rotation of the booms is accomplished by means of two hydraulic cylinders 9. One end of the hydraulic cylinder is pivotally attached to the cart at 10 and the other end of the cylinder is pivotally attached to bracket 11. Bracket 11 is fixed to main center boom 5.

In order to maintain the main center and wing booms transverse to the direction of travel when in the field position, wing hitch boom draws are connected from the cart frame 2 to the main wing booms 6 and 7. These are comprised of a bolt-on wing draw hitch latch arm 12, which detachably connects to inner boom draw arm 13 by means of a latch mechanism 14. Boom draw support arm 12A is pivotally mounted to the center portion of the cart 2 at pivot point 16. It is also pivotally connected to inner boom draw arm 13 at pivot point 15. Inner boom draw arm 13 is pivotally connected to outer boom draw arm 17 at pivot point 18. Pivot point 18 may also be locked by means of a pin (not shown). Outer boom draw arm 17 is pivotally connected to boom wing hitch 20 at pivot point 19.

The main wing booms 6 and 7 are supported in the transport position by means of boom transfer wheel 21 and in the field operating position by boom field wheel 21A. These wheels are non-castoring. In FIG. 1 it is boom field wheel 21A which is shown supporting the left main wing boom 7 in the field operating position.

Also shown in FIG. 1 is the spray distribution system for the spraying operation of the implement. This consists of a three section dry spray boom which includes a center dry spray boom 22, right wing dry spray boom 23 and left wing dry spray boom 24. These spray booms are pivotally mounted in brackets (not shown in FIG. 1) rearwardly of the main center boom 5, right wing main boom 6 and left wing main boom 7, and spaced thereto in parallel relationship. One also notes that the dry spray booms 22, 23 and 24 are mounted under the harrow arm receivers 29.

The spray distribution system also consists of a three section wet spray boom through which the herbicide or pesticide flows. There is a center wet spray boom 25, left wing wet spray boom 26 and right wing wet spray boom 27. The wet spray boom sections are connected to adjacent sections by means of flexible hose connections 28.

The wet spray booms 25, 26 and 27 are spaced apart and in parallel relationship to the dry spray booms 22, 23 and 24 and connected thereto by means of struts 35. The struts are perpendicular to the wet and dry spray booms and fixedly attached thereto such that when the dry spray booms 22, 23 and 24 are rotated by means of spray boom height adjustment levers 36, the wet spray booms 25, 26 and 27 are adjusted in height in an arcuate movement about the axis of the dry spray booms 22, 23 and 24.

As previously mentioned, in order to secure the harrows onto the implement, a series of elongate, rectangular harrow arm receivers 29 are affixed to the main booms 5, 6 and 7. These are fixedly attached and extend rearwardly and perpendicular to the main wing booms when the implement is in the operating position.

The harrow arm receivers 29 are attached to the harrow lift arms 30 by means of a detach/re-attach system which will be explained in greater detail in connection with other drawings. For the present time, it is sufficient to say that the harrow arm receivers 29 are equipped with a vertically oriented flat plate at their rear ends shown as 31. The harrow lift arms 30 are attached to a harrow frame 32 from which extends a plurality of spring loaded harrow tines 33. The height of the harrows can be adjusted by changing the angle of the tines 33. This is done by moving harrow height adjustment lever 34.

Figure 2:
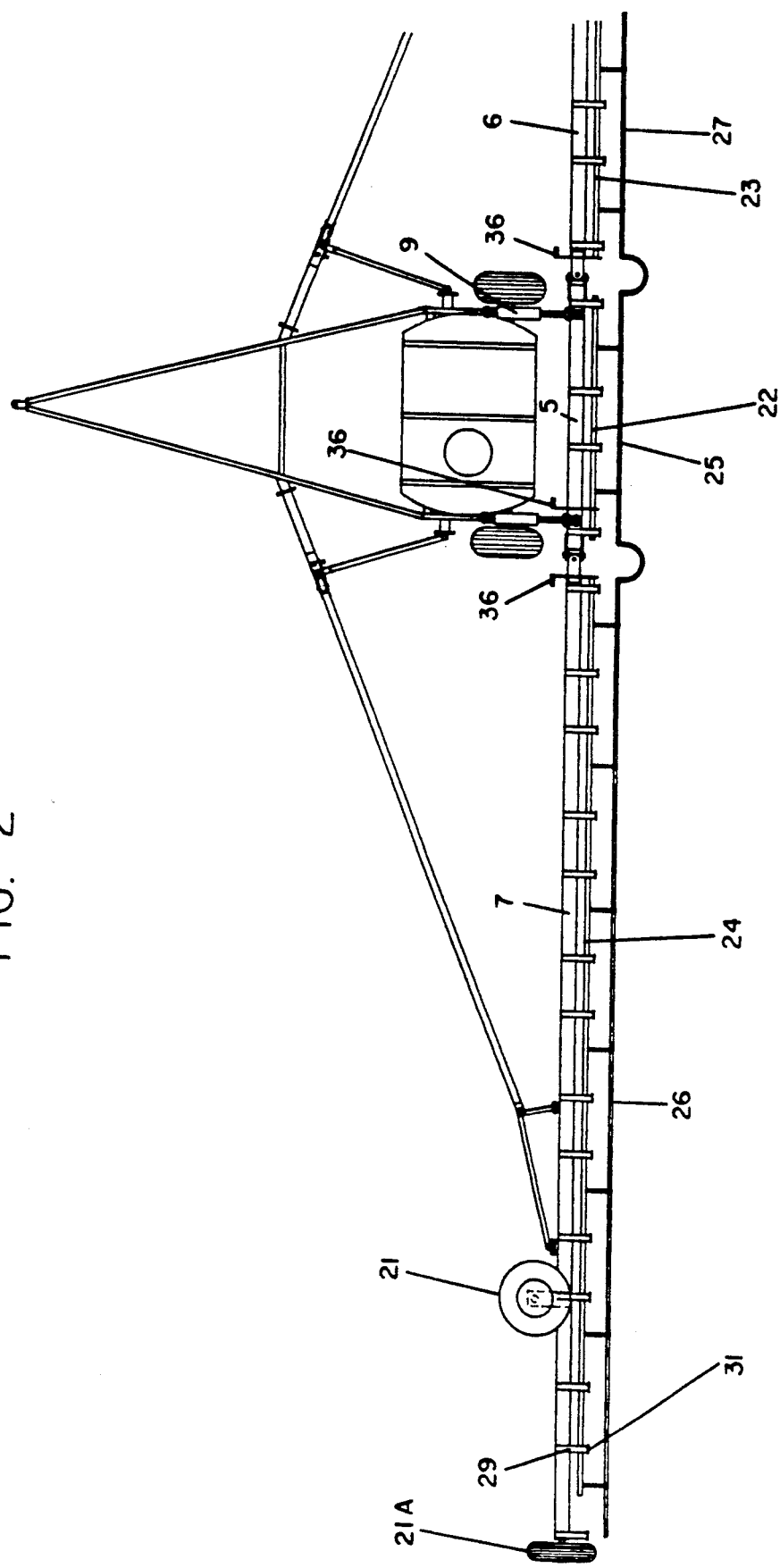
FIG. 2 is a similar view wherein the harrows have been removed.

In FIG. 2 a farm implement is shown in a top schematic view. The harrows which are comprised of tines 33, harrow frame 32 and harrow arms 30, have been removed. Only the harrow arm receivers 29, which are fixedly mounted on the main booms 5, 6 and 7, remain.

In FIG. 2 the implement continues to be in the operating or field position with the harrow arm receivers 29 extending rearwardly and the left wing boom 7 being supported by field wheel 21A. Of particular importance in FIG. 2 is that once the harrow arms 30 are removed, wet spray booms 25, 26 and 27 can be height adjusted upwardly without interference. In other words, when dry spray booms 22, 23 and 24 are rotated by means of spray boom height adjustment lever 36, wet spray booms 25, 26 and 27 are moved upwardly or downwardly by boom height adjustment lever 36. Height adjustment of the wet spray booms is most important for correct application of the pesticide or herbicide. Height adjustment will depend upon such factors as the height of the crop, type of nozzle used, and the contour of the land. The present invention is the only combination harrow and spray bar which allows for such varied height adjustment when the harrows are removed.

Figure 3:
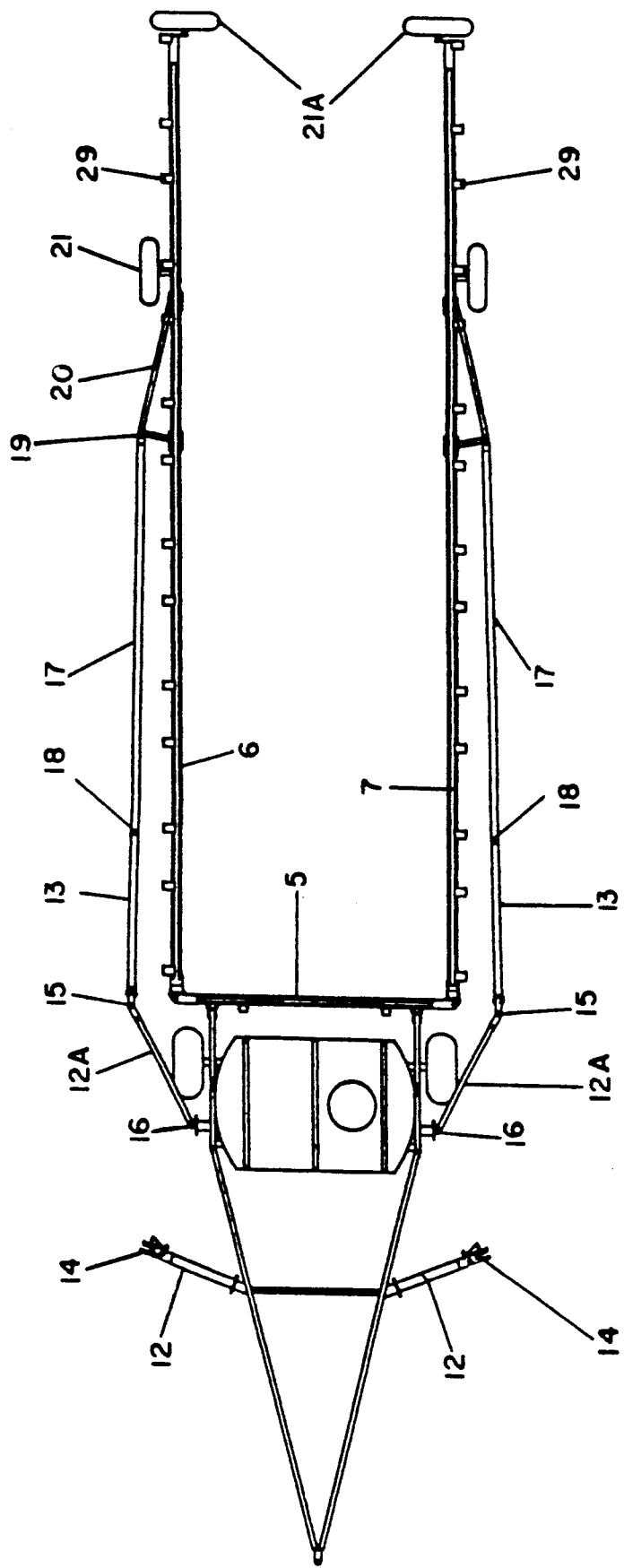
FIG. 3 is a top view of the implement with harrows removed, in the transport position.

FIG. 3 illustrates a top view of the implement which has been rearwardly folded into a transport position. One notes that the implement is now supported by means of transport wheels 21. The main booms 5, 6 and 7 have been rotated by means of hydraulic cylinders 9 (not shown in FIG. 3). One also notes that latches 14 on the end of wing draw hitches 12 are open and that inner and outer boom draw arms 13 and 17 are no longer connected to the latch 14 but have moved rearwardly, being connected at pivot point 15 to boom draw support arm 12a. Also, because main booms 5, 6 and 7 have been rotated through an angle of substantially 90° harrow arm receivers 29 extend vertically upwards from the main booms 5, 6 and 7. Although not shown in FIG. 3, it is possible to rotate the wing booms and put the implement in transport position with the harrow arms 31, harrow frames 32 and harrow tines 33, remaining on the machine.

Figure 4:
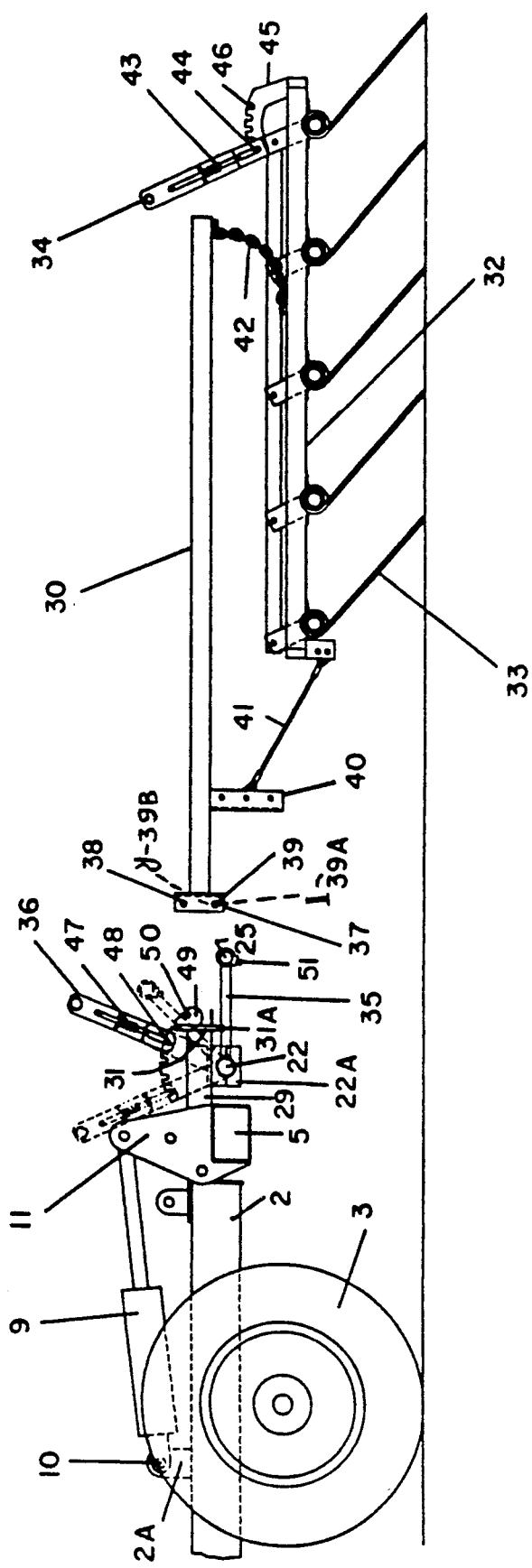
FIG. 4 is a side view or section taken approximately through the line 4,4 of FIG. 1.

FIG. 4 is a section of the machine taken approximately through line 4, 4 of FIG. 1. On the left hand side of the drawing, cart frame 2 is supported by support wheel 3. Hydraulic cylinder 9 is pivotally connected at 10 to a bracket 2A on cart frame 2. The opposite end of the hydraulic cylinder is pivotally connected to bracket 11 which is fixedly connected to center main boom 5. Harrow arm receiver 29 extends rearwardly and horizontally from center main boom 5 in the operating field position. Vertically mounted attach plate 31 is affixed to the rear end of harrow arm receiver 29.

In FIG. 4, in solid lines, center wet spray boom 25 extends substantially horizontally and rearwardly of dry spray boom 22, it being attached to struts 35. Spray boom height adjustment lever 36 is shown in solid lines. At the front end of harrow lift arm 30, which is shown detached from harrow arm receiver 29, is a substantially U-shaped (three-sided) female harrow lift arm attachment bracket 37. Female harrow lift arm attachment bracket 37 is in the form of a rectangular box which has its upper and lower ends removed and its foremost side removed. An upper horizontally disposed permanent rod extends from side to side, terminating at points 38. On the lower portion of the U-shaped female attachment bracket 37, are two horizontally aligned holes 39, one in each side of the bracket. The purpose of these holes is to receive a removable pin 39A. In order to attach harrow lift arm 30 to harrow arm receiver 29, upper horizontal rod 38 must be raised over the top of male vertical plate 31 such that rod 38 sits on top of harrow arm receiver arm 29. Thereafter pin 39a is inserted through pin apertures 39 to substantially abut the underside of harrow arm receiver 29. Pin 39A is prevented from moving rearwardly by means of downwardly extending portion 31A of plate 31. Pin 39A is fixed in place in the apertures 39 by a clip 39B.

In FIG. 4, the configuration of the harrow assembly is shown in detail. Harrow lift arm 30 has a downwardly extending frame projection 40. Harrow frame 32 is attached to harrow arm projection 40 by means of a flexible cable 41 and similarly harrow frame 32 is attached to harrow lift arm 30 by means of a chain 42. In this manner, the operator can easily lift harrow lift arm 30 rearwardly to detach the harrow from the harrow arm receiver 29, and forwardly to re-attach the harrow, without having to lift the entire weight of the harrow frame 32 and tines 33.

More particularly, when in operation, the implement stops, harrow lift arm 30 will be in the forwardmost position with cable 41 taut. In order to detach harrow lift arm 30, the operator simply removes pin 39A, and moves the harrow lift arm 30 upwardly and rearwardly, thus releasing the tension on flexible cable 41. In this manner the harrow can be left in the field. The height of the harrow frame 32 is adjustable by means of changing the angle of the harrow tines 33. This is accomplished by harrow/tine angle control arm 34 which has a spring 43 loaded pin 44 which is retracted out of grooves 46 of gauge 45. As harrow/tine angle control arm 34 is rotated, pin 44 can be reseated in any one of a plurality of grooves 46 in gauge 45, depending upon the desired angle of the harrow tines. Obviously the angle of the harrow tines 33 will determine the depth which the implement works the soil.

In the position shown in FIG. 4, the harrow lift arms 30 have been removed from harrow arm receivers 29, thereby allowing wet spray boom 25 to be moved by means of the rotation of dry spray boom 22 which is rotatably mounted within bracket 22A. Bracket 22A is fixedly attached to the underside of harrow arm receiver 29. Wet spray boom height control 36 again has a spring 47 loaded pin 48, which fits within grooves 50 of gauge 49. Each movement of the pin into an adjacent groove moves the wet spray boom 25 through an angle of approximately 15°.

In both of FIGS. 5 and 6, the detachable harrow lift arm 30 and harrows have been removed from the harrow arm receivers 29. The difference, however, is that in FIG. 5 the machine is shown in the field or operating position, and in FIG. 6 it is in the transport position.

The operation of the implement will now be described. Commencing with FIG. 1, the implement is shown in the field or operating position with harrows attached. In this position the machine can be used for both spraying and harrowing at the same time, i.e., before the crop is sown. There is little possible height adjustment of the wet spray booms 25, 26 and 27 but successful spraying and harrowing at the same time for pre-emergent crops can be accomplished. Moreover, if the operator wishes to place the implement into the transport position with the harrows connected, it can be accomplished.

In order to go to transport position, hydraulic cylinders 9 are activated and the pistons retracted. As shown in FIG. 6, bracket 11 is pulled forwardly thereby rotating main center boom 5 approximately 90°. In that position harrow arm receivers 29 are vertically oriented. Although not shown in FIG. 6, detachable harrow lift arms 30 would be in place and extend vertically upward from harrow receiver arm 29 with harrow frames 32 and tines 33 attached.

Once the harrows are in the vertical position, latch mechanisms 14 on wing hitches 12, are opened by means of a cable connected either to the boom, or to the power source. This allows inner boom draw arm 13 to detach from latch mechanism 14. Thereafter the implement is moved in a forward direction by the power source. It is also to be noted that when the implement is in the position shown in FIG. 6, boom transport wheels 21 have been rotated downwardly and thereby support right and left main wing booms 6 and 7.

As the implement is moved forwardly, the remote ends of left and right main wing booms 6 and 7 will move rearwardly and inwardly such that the implement will be in a position shown in FIG. 3. In order to return the implement to the field or operating position, the power source moves the implement rearwardly until the wing booms are aligned as shown in FIG. 1. Latch mechanisms 14 on wing draw hitches 12 automatically secure inner boom draw arms 13. Thereafter, hydraulic cylinders 9 are activated and the pistons extended such that main center boom 5 and simultaneously, wing booms 6 and 7, (due to the universal type joint 8 connection) are rotated through 90°. Subsequently harrow frame 32 and tines 33 return to a substantially horizontal position with the harrows resting on the ground.

If the operator wishes to use the implement for spraying only, he will detach the harrows. This is particularly important once a crop is in the advanced growing stage. Moreover, if the harrows are left on they will cause significant damage to the crop.

In order to remove the harrows, the operator removes pins 39A from apertures 39. Although not shown, pin 39A has a small indentation thereon to receive a standard clip pin (not shown) on the opposite side of bracket 37.

Thereafter, the harrow arm 30 is lifted over vertical plate 31 such that horizontal rod 38 clears the top of plate 31A. The flexible cable 41 and chain 42 permit the harrow lift arm to be moved rearwardly and to rest upon harrow frame 32. There are obviously a plurality of harrow arm receivers 29 and harrow arms 30 which must be detached; 32 of each are shown in the embodiment currently being described. It is not a cumbersome or time-consuming task and within less than 10 minutes the operator is ready to proceed, leaving the harrows behind.

In order to obtain the correct height adjustment for spraying of wet spray booms 25, 26 and 27, the three boom control arms 36, shown in the present embodiment, are activated separately by the operator and the wet spray booms raised or lowered to the desired position. Thereafter the operator can continue the spraying operation.

When the operator wishes to resume a harrowing operation, the implement is moved to the front of the detachable harrows which have been left in the field. Thereafter it is moved rearwardly until the harrow arm receivers 29 lie adjacent to the harrow lift arms 30. Again the operator dismounts and couples each of the harrow lift arms 30, by means of pin 39A, onto its respective harrow arm receiver 29. At that point the operator can resume his harrowing operation.

It should be noted that prior to coupling the harrow lift arms 30 onto the harrow arm receivers 29, it will be necessary to move the wet spray booms 25, 26 and 27 downwardly or upwardly in order that they clear the line of connection between the lift arms 30 and arm receivers 29. This, again, is accomplished by simply moving boom height control arms 36 and adjusting pins 48 into the appropriate grooves 50 of gauges 49.

Although a particular embodiment of the invention has been described, it is understood that the invention is intended to include any combination harrow sprayer which has ready-detachable harrows and height adjustable wet spray booms.

What we claim as our invention is:

1. A rearwardly folding harrow sprayer implement adapted to be towed by a power source such as a tractor for use in pre- and post-emergent spraying operations, said implement comprising:
    a framed cart adapted to support a spray tank;
    a wheeled support, including a forwardly extending hitch, supporting said framed cart;
    a central main boom mounted on said cart, and at least two main wing booms attached to said central main boom by universal type joints;
    a plurality of harrow arm receivers fixedly mounted to said main booms, extending rearwardly therefrom when the implement is in a field position, and vertically therefrom when the implement is in a transport position;
    each of said harrow arm receivers comprising an elongate arm, rectangular in cross section, and a rectangular planar end plate of greater cross section than said arm, and which end plate is fixedly mounted to the remote end of, and extends above and below said arm when the implement is in the field position;

harrow frames each having a plurality of tines thereon;

a plurality of harrow lift arms each including a connection adapted to detachably receive one of said harrow arm receivers;

said harrow lift arms being flexibly connected to said harrow frames by means of cables or chains such that when said harrow lift arms are to be connected or disconnected to said harrow arm receivers, said harrow lift arms can be moved independently of said harrow frames without moving said harrow frames;

power means for rotating said main booms from said field position to said transport position and vice versa;

a dry spray boom comprising a central section and at least two wing sections, each of said sections being rotatably supported int he implement and being parallel to said main booms;

said sections of said dry spray boom lying adjacent said main booms, respectively;

a wet spray boom comprising a central section and at least two wing sections, each of said sections of said wet spray boom being spaced apart and parallel to respective sections of said dry spray booms and attached thereto by a series of struts which are perpendicular to said wet and dry spray booms;

means for rotating said dry spray boom sections thereby raising or lowering said respective wet boom sections;

a plurality of spray nozzles attached to said wet spray boom sections;

a boom draw attached to each of said main wing booms at a respective end thereof, each said boom draw including an inner boom draw arm, an outer boom draw arm pivotably attached to said inner boom draw arm, said boom draw arms capable of receiving a pin which will rigidly fix the positions of said boom draw arms relative to one another, a wing draw hitch latch arm extending outboard from said framed cart, a latch detachably connecting said wing draw hitch latch arm to said boom draw arms, and a support arm pivotally attached to said framed cart and to said inner boom draw arm; and wheel means for supporting said main wing booms in said field and said transport positions;

whereby when said harrow arms are disconnected from said harrow arm receivers, said harrow arms, harrow frames. and tines can be left int he field permitting said implement to be used as a sprayer, when said means for rotating said dry spray boom sections are activated, said wet spray booms are raised or lowered to a desired height from the ground to provide an effective spraying operation for crops which have emerged from the ground, and when said spraying operation is terminated, and said implement is moved rearwardly to an original position, said wet spray booms can be raised to clear said harrow arms so that said harrow arms can be reconnected to said harrow arm receivers, thus providing an implement capable of both harrowing and spraying operations.

2. An implement as claimed in claim 1, wherein each said connection of the harrow lift arms comprises a vertically oriented three-sided hitch mounted at right angles to the forward end of a bar of said harrow lift arm;

said hitch including:
  a horizontally disposed rod fixedly connecting two sides of said hitch near the top portion thereof, and a pair of aligned apertures in said two sides near the bottom portion thereof,
  said apertures being adapted to receive a slip bolt in a manner in which the slip bolt can protrude through said holes and be fixed in place with a clip; and
  wherein said hitch is adapted to receive said rectangular planar end plate fixedly mounted on the rearmost end of said harrow arm receiver and to be lockably attached thereto by the slip bolt and clip.

3. An implement as claimed in claim 2 wherein said means adapted to rotate said dry spray boom sections comprises a plurality of mechanisms, each of which is adapted to individually rotate one of said dry spray boom sections manually, and wherein the implement further comprises arcuate gauges fixedly attached to said harrow arm receivers, each of said gauges defining a plurality of indentations, each of said mechanisms including a boom height adjustment lever fixedly attached to a said dry spray boom section and extending outwardly and perpendicularly therefrom, said lever including a spring-loaded projection adapted to rest in any one of a plurality of the indentations in a said arcuate gauge.

4. A rearwardly folding harrow sprayer implement comprising:

a plurality of main booms;

a plurality of harrow arm receivers fixedly mounted to said main booms and extending rearwardly therefrom when the implement is in a field position and vertically therefrom when the implement is in the transport position;

each of said harrow arm receivers comprising an elongate arm, rectangular in cross section, and a rectangular planar end plate of greater cross section than said arm, and which end plate is fixedly mounted to the remote end of, and extends above and below said arm when the implement is in the field position;

harrow frames each having a plurality of tines thereon;

a plurality of harrow lift arms each including a connection adapted to detachably receive one of said harrow arm receivers; and said harrow lift arms being flexibly connected to said harrow frames by means of cable or chains such that when said harrow lift arms are to be connected or disconnected to said harrow arm receivers, said harrow lift arms can be moved independently of said harrow frames without moving said harrow frames.

5. A rearwardly folding harrow sprayer implement comprising:

a plurality of main booms;

a plurality of harrow arm receivers fixedly mounted to said main booms and extending rearwardly therefrom when the implement is in a field position and vertically therefrom when the implement is in the transport position;

each of said harrow arm receivers comprising an elongate arm, rectangular in cross section, and a rectangular planar end plate of greater cross section than said arm, and which end plate is fixedly mounted to the remote end of, and extends above and below said arm when the implement is in the field position;

harrow frames each having a plurality of tines thereon;

a plurality of harrow lift arms each including a connection adapted to detachably receive one of said harrow arm receivers;

said harrow lift arms being flexibly connected to said harrow frames by means of cables or chains such that when said harrow lift arms are to be connected or disconnected to said harrow arm receivers, said harrow lift arms can be moved independently of said harrow frames without moving said harrow frames;

each said connection of the harrow lift arms comprising a vertically oriented three-sided nitch mounted at right angles to the forward end of a bar of said harrow lift arm;

said hitch including:

a horizontally disposed rod fixedly connecting two sides of said hitch near the top portion thereof, and a pair of aligned apertures in said two sides near the bottom portion thereof, said apertures being adapted to receiver a slip bolt in a manner in which the slip bolt can protrude through said holes and be fixed in place with a clip; and wherein said hitch is adapted to receive said rectangular planar end plate fixedly mounted on the rearmost end of said harrow arm receiver and to be lockably attached thereto by the slip bolt and clip.

6. A rearwardly folding harrow sprayer implement adapted to be towed by a power source such as a tractor for use in pre- and post-emergent spraying operations, said implement comprising:

a framed cart adapted to support a spray tank;

a wheeled support, including a forwardly extending hitch, supporting said framed cart;

a central main boom mounted on said cart, and at least two main wing booms attached to said central main boom by universal type joints;

a plurality of harrow arm receivers fixedly mounted to said main booms extending rearwardly therefrom when the implement is in a field position, and vertically therefrom when the implement is in a transport position;

power means for rotating said main booms from said field position to said transport position, and vice versa;

a dry spray boom comprising a central section and at least two wing sections, each of said sections being rotatably supported in the implement and extending parallel to said main booms;

a wet spray boom comprising a central section and at least two wing sections, each of said sections of said wet spray boom being spaced apart and parallel to said dry spray boom sections, respectively, and attached thereto by a series of struts;

means for rotating said dry spray boom sections thereby raising or lowering said respective wet boom sections;

each of said dry spray boom sections being disposed to the rear of said main booms and mounted on the underside of said harrow arm receivers such that when said harrow lift arms are attached to said harrow arm receivers, the wet spray boom sections are capable of being moved to varying heights between the ground and the harrow lift arms for pre-emergent spraying, and when said harrow lift arms are detached from said harrow arm receivers, said wet spray boom sections are capable of being rotated through an additional arcuate path of approximately 90° from the horizontal to the vertical for post-emergent spraying.

* * * * *